United States Patent
Fan (10) Patent No.: US 8,727,313 B2
(45) Date of Patent: May 20, 2014

(54) TRI-ECCENTRIC VALVE WITH A SYMMETRIC DRAIN-PROOF RING

(71) Applicant: Yi-Ming Fan, Taoyuan Hsien (TW)

(72) Inventor: Yi-Ming Fan, Taoyuan Hsien (TW)

(73) Assignee: JDV Control Valves Co., Ltd, Yangmei, Taoyuan County (TW)

( * ) Notice: Subject to any disclaimer, the term of this patent is extended or adjusted under 35 U.S.C. 154(b) by 0 days.

(21) Appl. No.: 13/626,893

(22) Filed: Sep. 26, 2012

(65) Prior Publication Data

US 2014/0084201 A1 Mar. 27, 2014

(51) Int. Cl.
*F16K 1/22* (2006.01)

(52) U.S. Cl.
USPC .......................................... 251/306; 251/368

(58) Field of Classification Search
USPC ......................................... 251/305–308, 368
See application file for complete search history.

(56) References Cited

U.S. PATENT DOCUMENTS

| 3,290,001 | A | * | 12/1966 | Taylor | 251/306 |
| 4,254,937 | A | * | 3/1981 | Hubertson | 251/305 |
| 4,284,264 | A | | 8/1981 | Hubertson | |
| 7,296,585 | B2 | * | 11/2007 | Eggleston et al. | 251/306 |

FOREIGN PATENT DOCUMENTS

| CN | 00229687 | 12/2000 |
| CN | 02209840.2 | 4/2003 |
| CN | 200820221520.5 | 10/2009 |

* cited by examiner

*Primary Examiner* — John Bastianelli (57) ABSTRACT

A tri-eccentric valve with a symmetric drain-proof ring includes a valve body, a stem, a valve disk, a waterproof washer, and a drain-proof ring. The valve disk is formed as an asymmetric conical shape. The drain-proof ring is an O ring and is arranged in a stepped recess of the valve disk to seal the waterproof washer; the drain-proof ring is symmetric to the axis of the ring. In assembly state, a periphery of the drain-proof ring resists against an inner wall of the annular seat. The drain-proof ring is symmetrical and thus is easy to be installed to the valve disk without to align the drain-proof ring to a specific angle. Furthermore, it can be designed by computers and is manufactured by machines. When dirt accumulates on the drain-proof ring, it can remove the dirt by directly rotating the drain-proof ring.

13 Claims, 8 Drawing Sheets

TRI-ECCENTRIC VALVE WITH A SYMMETRIC DRAIN-PROOF RING

FIELD OF THE INVENTION

The present invention related to valves, and in particular to a tri-eccentric valve with a symmetric drain-proof ring.

BACKGROUND OF THE INVENTION

Figure 8:
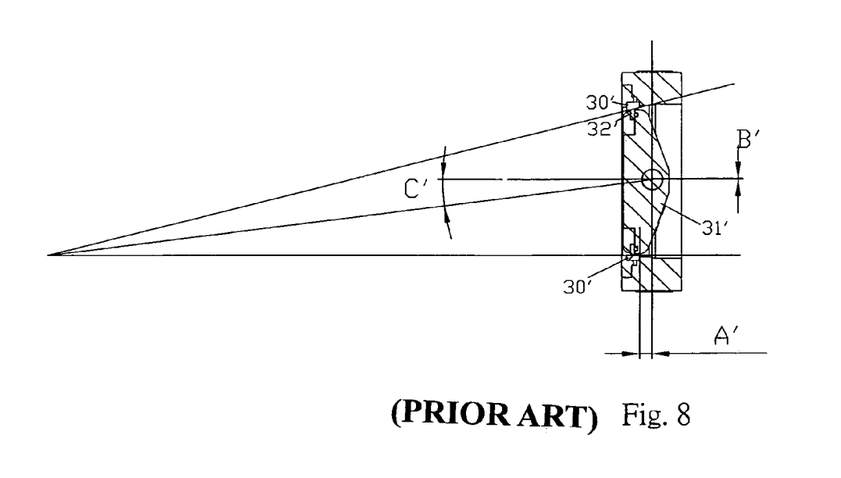
FIG. 8 is a schematic view of a prior art valve.

With reference to FIG. 8, a prior art tri-eccentric valve structure is illustrated. Such kind of valve has been disclosed in some prior art, such U.S. Pat. No. 4,284,264, CN00229687, CN02209840, and CN200820221520.

In FIG. 1, the prior art disk valve has a valve body 1' having a chamber 10', a stem 2' passing through the valve body 1' to the chamber 10'; an annular seat 30' installed in the chamber 10'; and an drain-proof ring 32' which is an O ring. The drain-proof ring 32' is asymmetric to an axis passing through a center of the ring. A valve disk 31' is installed to the valve disk 31'. A radial hole radially passes through the valve disk 31' for receiving the stem 2' for controlling the valve disk 31' to open or close.

The drain-proof ring is a tri-eccentric structure. That is, referring to FIG. 4, a longitudinal radial line of the valve disk is shifted from a longitudinal radial line of the valve body, this is so-called first shift (A'); an axial center of the valve disk is shifted from the center of the valve body, this is so-called second shift (B'); the valve disk 31' is an asymmetric taper so as to form as a third shift (C'). Since in the prior art, the valve disk 31' is an asymmetric taper (see FIG. 7) and thus the drain-proof ring 32' received in an annular trench of the valve disk 31' is also an asymmetric structure for tightly contracting the annular seat 30' received in the inner annular wall of the valve body 1. As a result, every radial part of the drain-proof ring 32' is critically defined to match the shape of the annular seat 30'. Thus, it is very difficult to manufacture this ring. Furthermore, a slight rotation of the drain-proof ring 32' with respect to the annular seat 30' will induce gaps between the valve body and the valve disk and thus fluid will drain out from one side of the valve to another side.

Figure 7:
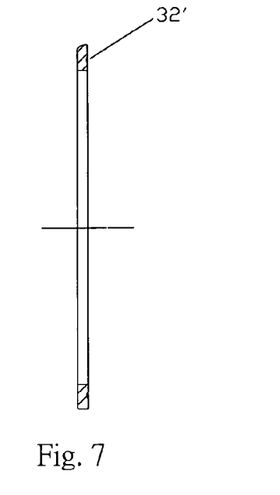
FIG. 7 is a schematic view showing the prior art drain-proof ring.

As illustrated in FIGS. 7 and 8, it is illustrated that in the prior tri-shifting valve, a lower side of the valve is horizontal and the upper side thereof is inclined. The slopes of sides between the upper and lower sides are between the slope of the horizontal line and the slope of the included line of the upper side. As a result, the edges of the drain-proof ring 32' (see FIG. 7) are asymmetrical with respect to the middle axial line. This induces the difficulties in manufacturing process because it must be precise to form the desired shape. Furthermore, in installing the drain-proof ring, the positioning of the ring must be very accurately to fit the shape of the annular seat around the ring so that the drain-proof ring can completely seal the two sides of the valve. Moreover, the slight rotation of the ring will destroy the seal.

Therefore, there is an eager demand for a novel design which can improve the above mentioned defects.

SUMMARY OF THE INVENTION

Accordingly, the object of the present invention is to provide a tri-eccentric valve with a symmetric drain-proof ring, wherein in the present invention, the drain-proof ring is symmetrical, which still tightly seal flows at two sides of the valve disk, it is easy to install the drain-proof ring to the valve disk without to align the drain-proof ring to a specific angle, but the prior art drain-proof ring must be installed to the valve disk with a specific angle. Since the drain-proof ring of the present invention is symmetric and thus it can be designed by computers and is manufactured by machines, but the prior art asymmetric drain-proof ring is made by manual works. Moreover, in use, when dirt accumulates on the drain-proof ring, it can remove the dirt by directly rotating the drain-proof ring.

Therefore, the object of the present invention is to provide a tri-eccentric valve with a symmetric drain-proof ring, comprising: a valve body (1) having a chamber (10) therein; a wall of the chamber being formed with an annular trench for receiving an annular seat (30); a radial cross section of the annular seat having a trapezoidal shape; the annular seat (30) being detachable; a stem (2) penetrating through the valve body (1) so as to protrude into the chamber (10); a top end protruding from the valve body (1) having an operation unit for driving the stem (2) to rotate; a valve disk (31) installed in the chamber (10) of the valve body (1) and contacting an inner wall of the annular seat (30); a radial hole (310) being formed radially along the valve disk (31) for receiving the stem (20 so that rotation of the stem will rotate the valve disk for opening or closing the valve; and a rear side of the valve disk (31) being formed with a stepped recess (311); the valve disk (31) is formed as an asymmetric conical shape; a waterproof washer (33) being a ring and being received in the annular trench of the valve disk (1); and a drain-proof ring (32) being an O ring and being arranged in the stepped recess (311) of the valve disk (31) to seal the waterproof washer (33); the drain-proof ring (32) being symmetric to the axis of the ring; in assembly state, a periphery of the drain-proof ring (32) resisting against an inner wall of the annular seat (30) so as to tightly seal the space between the drain-proof ring and the annular seat; and wherein after assembly, a left side of an outer periphery of an assembled structure including the valve disk (31), the waterproof washer (33) and the drain-proof ring (32) has a conical shape; and when the waterproof washer deforms, the drain-proof ring has preferred flexibility, which can compensate the gap due to the deformation.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1A, 1B, 2, 3 to 4, the detained structure of the tri-eccentric valve according to the present invention is illustrated. The structure of the present invention has the following elements.

Figure 1A:
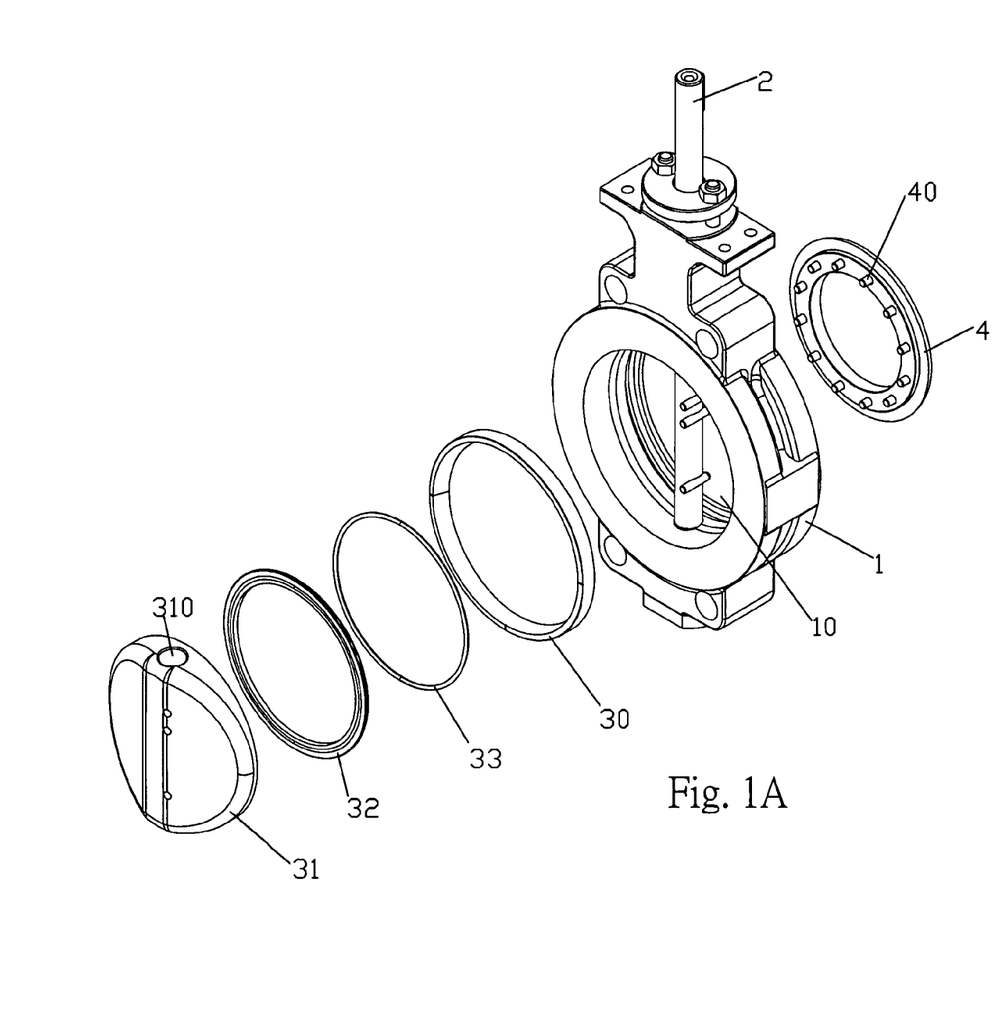
FIG. 1A is an exploded view of the valve body of the present invention.

A valve body 1 has a chamber 10 therein. A wall of the chamber 10 is formed with an annular trench for receiving an annular seat 30. A radial cross section of the annular seat 30 has a trapezoidal shape. In the present invention, the annular seat 30 is detachable.

A stem 2 penetrates through the valve body 1 so as to protrude into the chamber 10. A top end protrudes from the valve body 1 has an operation unit (not shown) for driving the stem 2 to rotate.

Figure 1B:
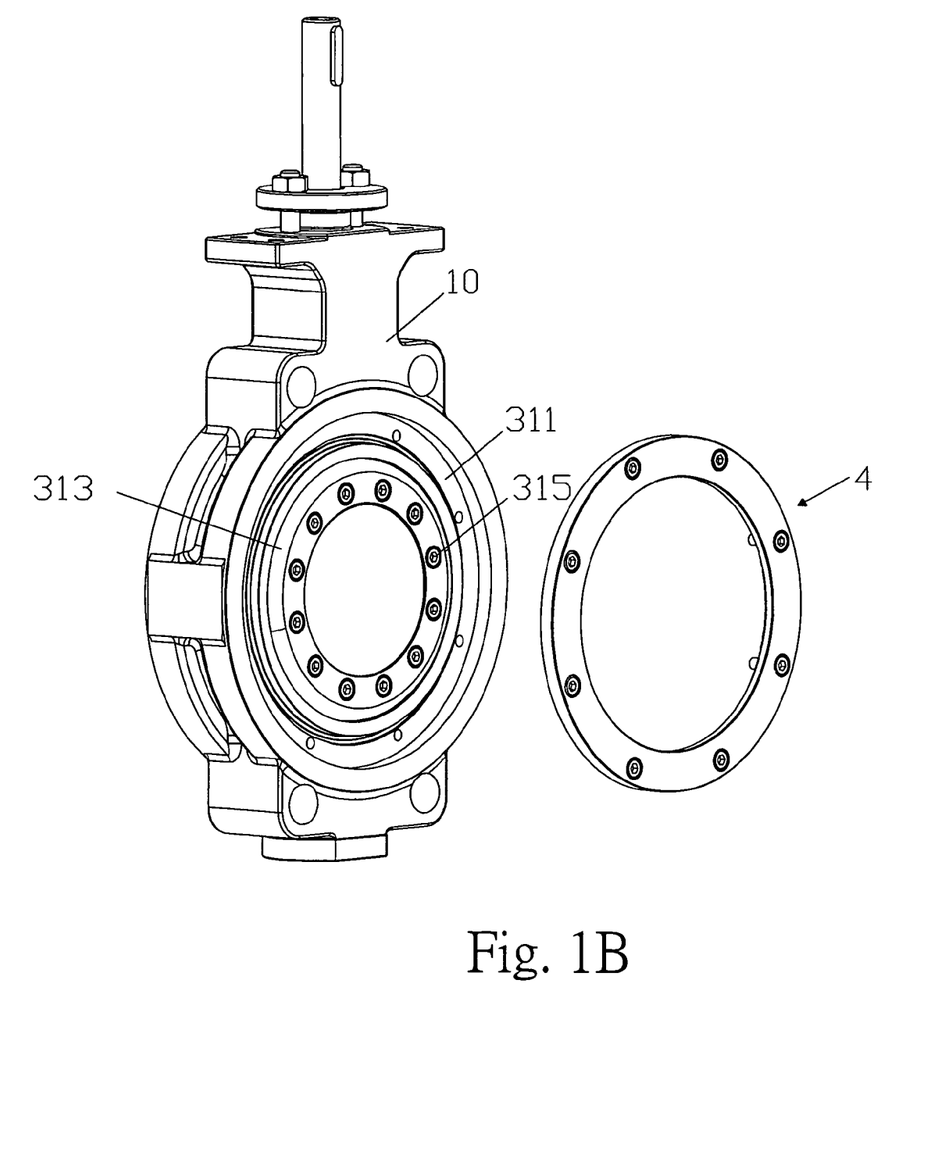
FIG. 1B shows a side view of the valve disk of the present invention.
Figure 2:
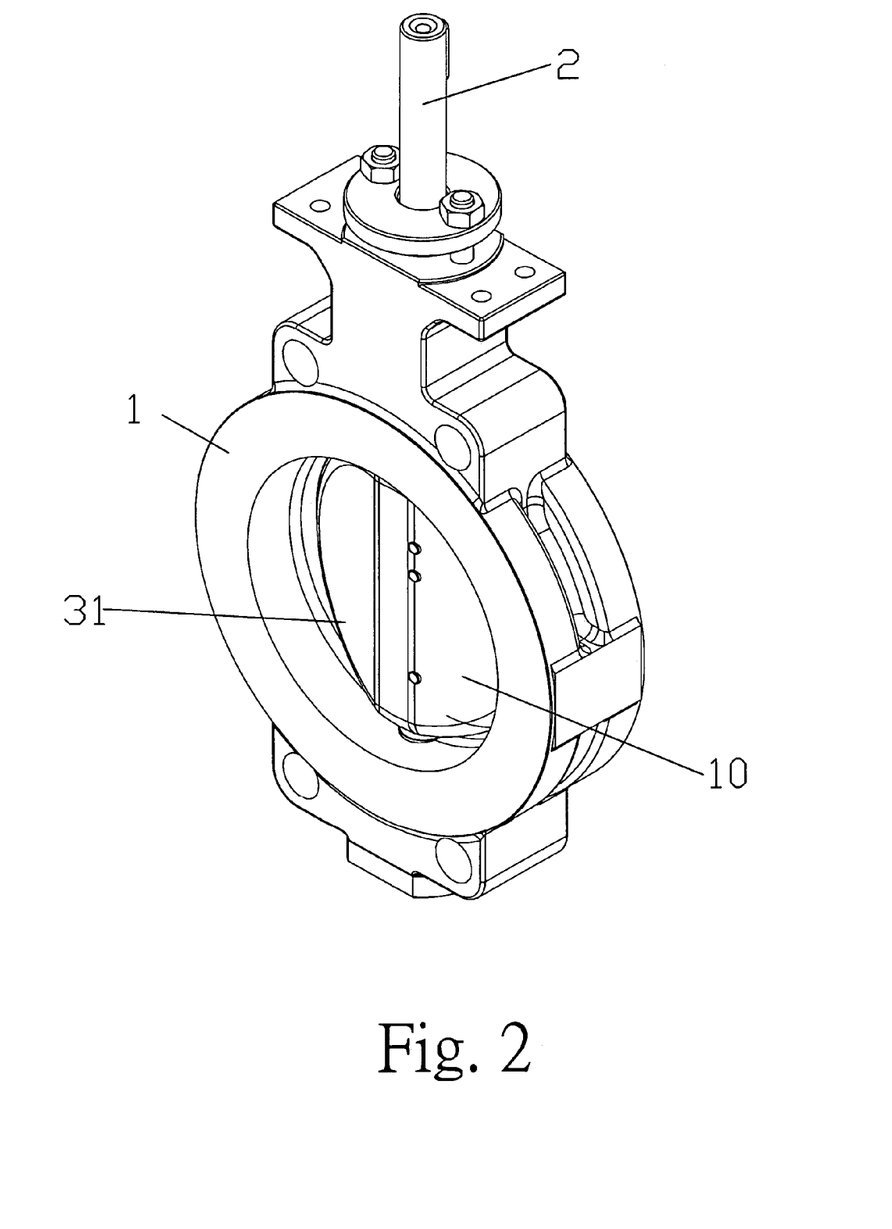
FIG. 2 is an assembled perspective view of the valve body of the present invention.
Figure 3:
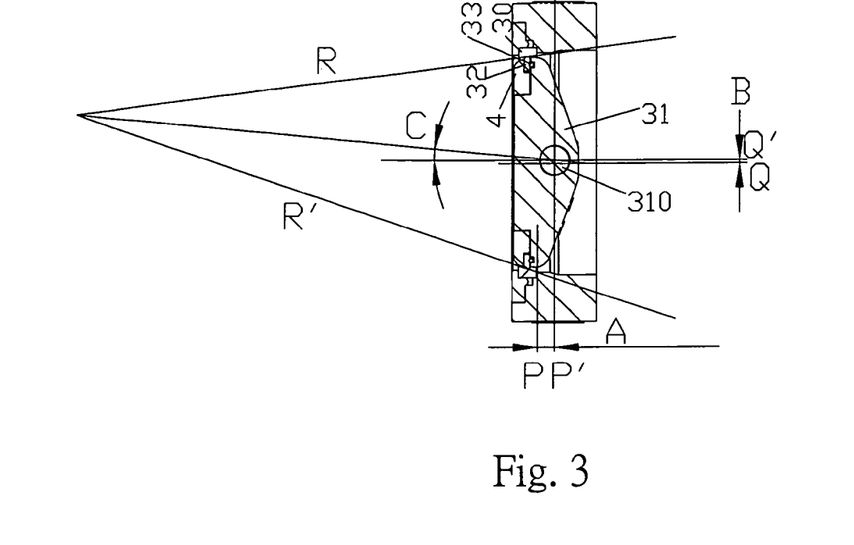
FIG. 3 is a cross sectional view showing the valve body of the present invention.

A valve disk 31 is installed in the chamber 10 of the valve body 1 and contacts an inner wall of the annular seat 30. A radial hole 310 (see FIG. 1A) is formed radially along the valve disk 31 for receiving the stem 2 so that rotation of the stem 2 will rotate the valve disk 31 for opening or closing the valve. Referring to FIG. 1B, a rear side of the valve disk 31 is formed with a stepped recess 311. An axial surface 312 in the stepped recess 311 of the valve disk 31 is formed with an annular trench 313. With reference to FIGS. 1 and 3, a front side of the valve disk 31 has a conical shape. The axial surface 312 of the valve disk 31 is formed with a plurality of grooves 315.

A waterproof washer 33 is a ring and is received in the annular trench 313 of the valve disk 31. Preferably, the waterproof washer 33 is made of metal or metal alloy.

Figure 5A:
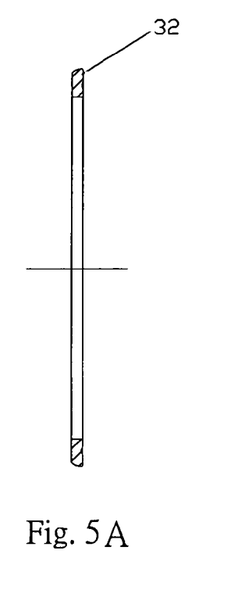
FIGS. 5A and 5B are schematic cross sectional view and perspective view, respectively, showing the drain-proof ring of the present invention.
Figure 5B:
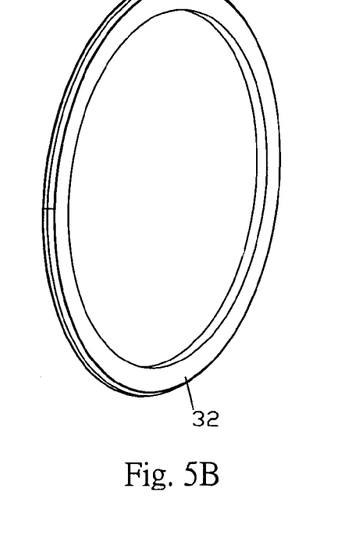

A drain-proof ring 32 (referring to FIGS. 5A and 5B) is an O ring and is arranged in the stepped recess 311 of the valve disk 31 to seal the waterproof washer 33. Referring to FIG. 5, the drain-proof ring 32 is symmetric to the axis of the ring. The drain-proof ring 32 is preferably made of silicon gel or graphite or PEFT, etc. In assembly state, a periphery of the drain-proof ring 32 resists against an inner wall of the annular seat 30 so as to tightly seal the space between the drain-proof ring 32 and the annular seat 30.

When the waterproof washer 33 deforms, the drain-proof ring 32 has preferred flexibility, which can compensate the gap due to the deformation of the waterproof washer 33.

With reference to FIG. 1C, an annual cover 4 is fitted to the stepped recess 311. A lateral side of the annular cover 4 is formed with a plurality of protrusions 40. The plurality of grooves 315 in the axial surface 312 of the valve disk 31 serves to receive the protrusions 40 of the annular cover 4. Or, the annular cover 4 can be screwed to the valve disk 31 (not shown).

With reference to FIG. 3, after assembly, a left side of an outer periphery of the valve disk assembly (including the valve disk 31, the waterproof washer 33 and the drain-proof ring 32) has a conical shape (referring to the tangent lines R and R').

The valve disk 31 of the present invention is formed as a tri-eccentric structure. The detail will be described herein with referring to FIG. 3. A maximum radial axis P of the valve disk 31 is shifted with a distance A from a radial line P' passing transversal center of the chamber 10 (see FIG. 3).

Furthermore, an axial central line Q of the valve disk 31 is shifted from an axial center line Q' of the chamber 10 of the valve body 1.

Figure 4:
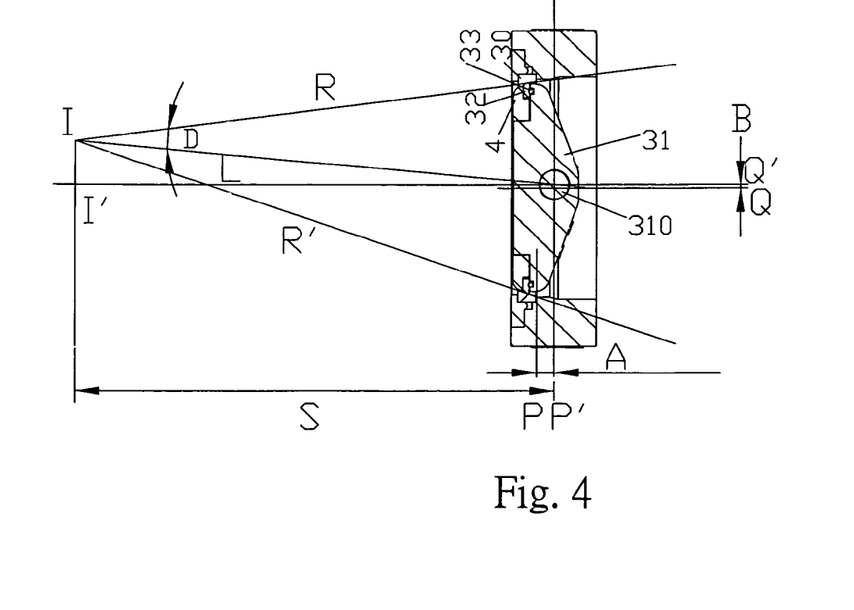
FIG. 4 is another cross sectional view of the valve body of the present invention.

With reference to FIG. 4, it is illustrated, that the conical shape of the valve disk 31 is an asymmetric conical shape according to the present invention. Slopes of tangent lines along a lateral side of the valve disk 31 are gradually changed from a largest one to a smallest one. An upper tangent line R tangent to an upper edge of the disk 31 has a largest slope; and a lower tangent line R' tangent to a lower edge of the disk 31 has a smallest slope, but not horizontal. The upper tangent line R is intersected with the lower tangent line R' at a point I, as illustrated in FIGS. 4 and 5, where the absolute value of the slope of the upper tangent line is smaller than that of the lower tangent line. A distance from the intersect point I to the axial central line Q' of the chamber 10 is smaller than a radius of the valve disk 31.

In a preferably design of the present invention, referring to FIG. 3, an angle C between the upper tangent line R and the axial central line Q' of the chamber 10 is between 2.5 to 10 degrees, preferably, between 4.5 to 8 degrees. Furthermore, referring to FIG. 4, an angle D between the upper tangent line R and a line L from the intersect point I to a center of the valve disk D is between 10 to 30 degrees, preferably between 14 to 23 degrees. Moreover, see FIG. 4, a distance between a vertical projection point I' of the intersect point I to the axial central line Q' of the chamber 10 and a center of the valve disk 31 is between 90 mm to 1500 mm, preferably between 130 mm to 1150 mm.

A feature of the present invention is that the valve disk 31 is not a symmetrical cone, but slopes of tangent lines along lateral sides of the valve disk 31 are gradually changed from a largest one (for R') to a smallest one (for R). However the annular seat 30 installed to the valve body 1 is in contact with the valve disk 31 and thus the slopes of the annular seat 30 must match to the slopes of the valve disk 31. The slopes of tangent lines along a lateral side of the annular seat 30 are gradually changed from a largest one to a smallest one as those of the valve disk 31.

However although the valve disk 31 is not a symmetrical tape, but in the present invention, the drain-proof ring 32 is a symmetrical ring (see FIGS. 5A and 5B) which still completely seal flows in two sides of the disk 30. In the prior art, the drain-proof ring 32' (see FIG. 7) must be unsymmetrical so as to completely seal flows in two sides of the valve disk 30, but this kind of ring is very difficult in manufacture since each radial part of the ring is critical defined for tightly sealing flows at two sides of the disk 30 so that in manufacturing, it needs to form these critical defined angles. It is difficult.

Figure 6A:
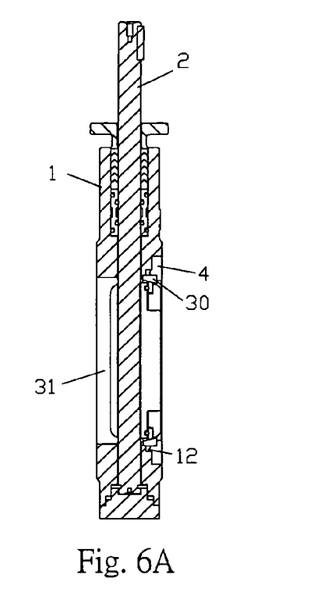
FIGS. 6A and 6B are cross section view and perspective view showing the detail structure about the valve disk and annular seat of the present invention.
Figure 6B:
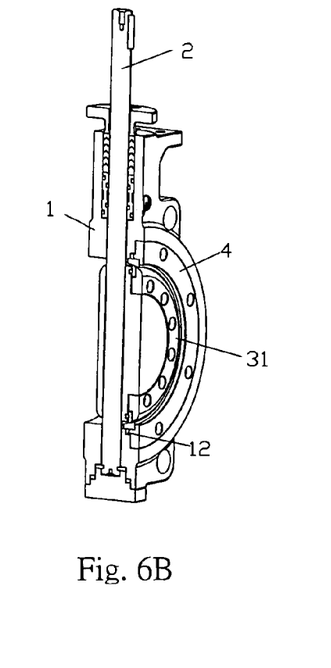
Figure 6C:
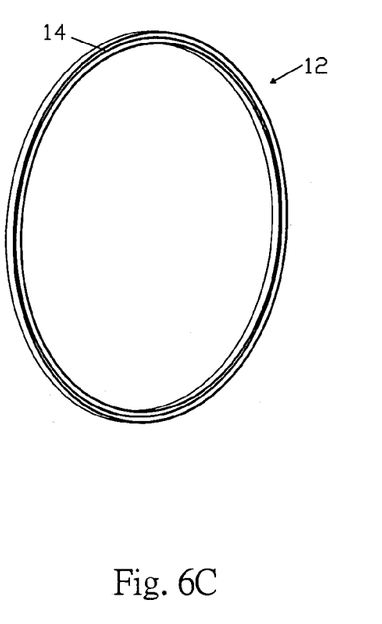
FIG. 6C is a perspective view of the sealing O ring of the present invention.
Figure 6D:
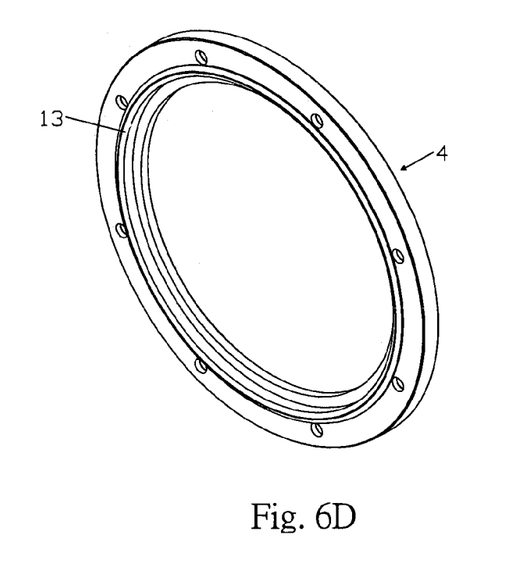
FIG. 6D is a perspective view of the cover of the present invention.

With reference to FIGS. 6A, 6B, 6C and 6D, in the present invention, a lateral side of the valve body 1 is formed with a stepped structure, and a cover 4 sealing an outer side of the annular recess. The annular seat 30 is installed between the cover 4 and the lateral side of the valve body 1. An annular space is formed between the cover 4 and the stepped recess for receiving a sealing O ring 12. With referring to FIG. 6D, in the present invention, a lateral side of the cover 4 is formed with an annular recess 13 with a V shape cross section 13. Referring to FIG. 6C, a surface of the sealing O ring 12 facing to the cover 4 is formed with V cross section protrusion 14 corresponding to the V shape annular recess 13 of the cover 4.

Referring to FIG. 3, in the present invention, in assembly, the annular seat 30 is installed to the valve body 1. The annular seat 30 is installed between the cover 4 and the lateral side of the valve body 1. An annular space is formed between the cover 4 and the stepped recess for receiving a sealing O ring 12. Then the waterproof washer 33 is installed to the annular trench of the valve disk 31. The drain-proof ring 32 (referring to FIGS. 5A and 5B) is arranged in the stepped recess 311 of the valve disk 31 to seal the waterproof washer 33. The annual cover 4 is fitted to the stepped recess 311. Then the valve disk 31 is placed to the chamber 10 of the valve body 1. The stem 2 penetrates through the valve body 1 so as to protrude into the chamber 10. The top end thereof protrudes from the valve body 1 has an operation unit (not shown) for driving the stem 2 to rotate. Then the stem 2 passes through the radial hole 310 so that rotation of the stem 2 will rotate the valve disk 31. The drain-proof unit 3 is installed between the valve disk 31 and the valve body 1. In maintenance, it is only needed to detach the annular cover 4 from the valve disk 31 and then take out the drain-proof ring 32 and waterproof washer 33 from the valve disk 31. The operation is easy and convenient.

Since in the present invention, the drain-proof ring 32 can be symmetrical, which still tightly seal flows at two sides of the valve disk 30, it is easy to install the drain-proof ring 32 to the valve disk 31 without to align the drain-proof ring 32 to a specific angle, but the prior art drain-proof ring 32' must be installed to the valve disk with a specific angle. This is because in the design of the present invention, the drain-proof ring 32 can still tightly contact the annular seat 30 without gaps therebetween to isolate flows at two sides of the valves. However the prior art drain-proof ring 32' in FIG. 7 is not symmetric and thus in installing, it must be aligned precisely.

Furthermore, since the drain-proof ring 32 of the present invention is symmetric and thus it can be designed by computers and is manufactured by machines, but the prior art asymmetric drain-proof ring is made by manual works.

Moreover, in use, when dirt accumulate on the drain-proof ring 32, it can remove the dirt by directly rotating the drain-proof ring 32. This is because the drain-proof ring of the present invention is a symmetric structure, but the prior art drain-proof ring 32 is asymmetric, and thus it can not remove the dirt by rotating the drain-proof ring 32.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A tri-eccentric valve with a symmetric drain-proof ring, comprising:
   a valve body (1) having a chamber (10) therein; a wall of the chamber being formed with an annular trench for receiving an annular seat (30); a radial cross section of the annular seat having a trapezoidal shape; the annular seat (30) being detachable;
   a stem (2) penetrating through the valve body (1) so as to protrude into the chamber (10); a top end protruding from the valve body (1) having an operation unit for driving the stem (2) to rotate;
   a valve disk (31) installed in the chamber (10) of the valve body (1) and contacting an inner wall of the annular seat (30); a radial hole (310) being formed radially along the valve disk (31) for receiving the stem (2) so that rotation of the stem will rotate the valve disk for opening or closing the valve; and a rear side of the valve disk (31) being formed with a stepped recess (311); the valve disk (31) being formed as an asymmetric conical shape;
   a waterproof washer (33) being a ring and being received in the annular trench of the valve disk (1); and
   a drain-proof ring (32) being an O ring and being arranged in the stepped recess (311) of the valve disk (31) to seal the waterproof washer (33); the drain-proof ring (32) being symmetric to the axis of the ring; in assembly state, a periphery of the drain-proof ring (32) resisting against an inner wall of the annular seat (30) so as to tightly seal the space between the drain-proof ring and the annular seat; and
   wherein after assembly, a left side of an outer periphery of an assembled structure including the valve disk (31), the waterproof washer (33) and the drain-proof ring (32) has a conical shape; and
   when the waterproof washer deforms, the drain-proof ring has flexibility, which can compensate for the gap due to the deformation.

2. The tri-eccentric valve as claimed in claim 1, wherein an axial surface (312) in the stepped recess (311) of the valve disk (31) is formed with an annular trench (313), a front side of the valve disk (31) is formed as a cone; the axial surface of the valve disk (31) is formed with a plurality of grooves (315); and
   an annular cover (4) is fitted to the stepped recess (311); a lateral side of the annular cover is formed with a plurality of protrusions (40); the plurality of grooves (315) in the axial surface of the valve disk serves to receive the protrusions of the annular cover.

3. The tri-eccentric valve as claimed in claim 1, wherein the conical shape of the valve disk (31) is an asymmetric conical shape; slopes of tangent lines along a lateral side of the valve disk are gradually changed from a largest one to a smallest one; an upper tangent line (R) tangent to an upper edge of the disk (31) has a largest slope; and a lower tangent line (R') tangent to a lower edge of the disk (31) has a smallest slope, but not horizontal; the upper tangent line (R) is intersected with the lower tangent line (R') at a point (I), where the absolute value of the slope of the upper tangent line (R) is smaller than that of the lower tangent line (R'); a distance from the intersect point (I) to an axial central line (Q') of the chamber (10) is smaller than a radius of the valve disk (31).

4. The tri-eccentric valve as claimed in claim 3, wherein a maximum radial axis (P) of the valve disk (31) is shifted with a distance (A) from a radial line (P') passing transversal center of the chamber (10); and
   an axial central line (Q) of the valve disk (31) is shifted from an axial center line (Q') of the chamber of the valve body.

5. The tri-eccentric valve as claimed in claim 4, wherein an angle (C) between the upper tangent line (R) and the axial central line (Q') of the chamber (10) is between 2.5 to 10 degrees.

6. The tri-eccentric valve as claimed in claim 5, wherein the angle (C) is between 4.5 to 8 degrees.

7. The tri-eccentric valve as claimed in claim 4, wherein an angle (D) between the upper tangent line (R) and a line (L) from the intersect point (I) to a center of the valve disk (D) is between 10 to 30 degrees.

8. The tri-eccentric valve as claimed in claim 7, wherein the angle (D) is between 14 to 23 degrees.

9. The tri-eccentric valve as claimed in claim 4, wherein a distance between a vertical projection point (I') of the intersect point (I) to the axial central line (Q') of the chamber (10) and a center of the valve disk (31) is between 90 mm to 1500 mm.

10. The tri-eccentric valve as claimed in claim 9, wherein the distance is between 130 mm to 1150 mm.

11. The tri-eccentric valve as claimed in claim 1, wherein a lateral side of the valve body (1) is formed with a stepped structure, and the cover (4) sealing an outer side of the annular recess; the annular seat (30) is installed between the cover (4) and the lateral side of the valve body (1); an annular space is formed between the cover (4) and the stepped recess for receiving a sealing O ring (12).

12. The tri-eccentric valve as claimed in claim 1, wherein a lateral side of the cover (4) is formed with an annular recess with a V shape cross section (13); and a surface of the sealing O ring (12) facing to the cover (4) is formed with V cross section protrusion (14) corresponding to the V shape annular recess of the cover (4).

13. The tri-eccentric valve as claimed in claim 1, wherein the waterproof washer (33) is made of metal or metal alloy; and the drain-proof ring (32) is made of silicon gel or graphite or PTFE.

\* \* \* \* \*